Nov. 26, 1968 J. VOGEL ET AL 3,413,652
SPECTRAL PHOTOMETER ANALYSIS RECORDER
Filed March 16, 1967 3 Sheets-Sheet 1

INVENTORS:
JOSEF VOGEL, GÜNTER ARNOLD, BERNHARD VINZELBERG, PETER FISCHER, OTTO KOCH,
HELMUT WALZ.

BY
ATTORNEYS

Nov. 26, 1968  J. VOGEL ET AL  3,413,652

SPECTRAL PHOTOMETER ANALYSIS RECORDER

Filed March 16, 1967  3 Sheets-Sheet 3

INVENTORS:
JOSEF VOGEL, GÜNTER ARNOLD, BERNHARD VINZELBERG, PETER FISCHER,
OTTO KOCH, HELMUT WALZ
BY
Burgess, Dinklage & Sprung
ATTORNEYS

# United States Patent Office 3,413,652
Patented Nov. 26, 1968

3,413,652
SPECTRAL PHOTOMETER ANALYSIS
RECORDER
Josef Vogel, Günter Arnold, and Bernhard Vinzelberg, Leverkusen, Peter Fischer, Odenthal uber Bergisch Gladbach, Otto Koch, Cologne-Stammheim, and Helmut Walz, Leverkusen, Germany, assignors to Farbenfabriken Bayer Aktiengesellschaft, Leverkusen, Germany, a corporation of Germany
Continuation-in-part of application Ser. No. 395,864, Sept. 11, 1964. This application Mar. 16, 1967, Ser. No. 623,713
Claims priority, application Germany, Sept. 13, 1963, F 40,749
10 Claims. (Cl. 346—33)

ABSTRACT OF THE DISCLOSURE

A spectral photometer analysis apparatus capable of measuring and recording the absorbence of successive multi-component fluid samples and having a switching circuit means for automatically controlling the wave length scan of a spectrophotometer and the operation of a multichannel recorder to measure and record the absorbence value as a function of wave length for the individual components of each sample in a predetermined order correlated with the presentation of successive samples to the spectrophotometer.

*Cross-reference to related application*

This application is a continuation-in-part of our previous application Ser. No. 395,864 filed Sept. 11, 1964, now abandoned.

*Background of the invention*

In the quantitative analysis of fluid mixtures, whether liquid or gaseous, the measurement of the absorbence and/or transmittance characteristics of a fluid sample is frequently utilized to determine the quantitative proportions of its components. Where these components have suitable absorption bands in the ultraviolet, visible or infra-red regions of the radiation spectrum, their quantitative determination can be carried out spectroscopically by the aid of a conventional spectrophotometer, such as type No. 137 made by the Perkin-Elmer Corporation.

However, conventional spectrophotometers are essentially restricted in their use to the analysis of samples having constant component proportions during the measuring interval, and cannot be used for continuous analysis of a flowing sample wherein the component proportions are time variable within the measuring interval.

The typical spectrophotometer has a cell into which the sample to be analyzed is introduced and contained during the measurement interval. A beam of radiation is passed through the sample and is partly absorbed and the remainder transmitted thereby. Absorption occurs at various wave length bands located at spectral regions characteristic of each sample component, and for a given component, the degree of absorption at its characteristic wave length bands is dependent upon its concentration.

In the analysis of a sample containing two or more components, it is desirable to be able to measure and record the absorption characteristics associated with each component separately so that the absorption signature of each component can be read from its own chart or recorder channel.

With a conventional spectrophotometer, the intensity of absorption is recorded as a function of wave length upon a drum chart which is driven in accordance with the wave length scan to produce a recording which is continuous over the wave length scan range. Such a recording provides no grouping of absorption data common to each component, and requires the analyst to examine various separate wave length regions of the chart in order to determine the concentrations of the different components.

The invention provides an apparatus whereby for each successive sample presented to the spectrophotometer, a wave length scan is performed and absorption values measured at wave lengths corresponding to separate components are recorded on individual recorder channels, one for each component. Thus, for a two components sample, all of the absorption data related to one component will be recorded on a first channel, and all absorption data related to the other component will be recorded on a second channel.

The apparatus of the invention is also adapted to analyze samples taken from different sources, as for example from two separate gas mixture streams.

In such case, a sample taken from the first stream is presented to the spectrophotometer and analyzed thereby with the absorption data for each component being recorded separately by a first group of recorder channels, after which a sample taken from the second stream is presented to the spectrophotometer and analyzed in a like manner with the absorption data for each second stream component being recorded separately by a second group of recorder channels.

Although with certain prior art spectrophotometers, it is possible to repeatedly investigate a selectable absorption spectral region, by controlling the wave length scan motor for repeated scanning operation, there exists no previously known spectrophotometer apparatus which during the course of scanning an overall spectral range, is capable of diverting absorption data from one recorder channel to another in accordance with wavelength to separately record all data pertaining to each component.

*Summary of the invention*

The invention basically provides a spectrophotometer of the wavelength scanning type which measures the degree of radiation absorbance by a fluid sample at wavelengths within a predetermined overall wavelength scan range or spectrum. For each fluid sample presented, the spectrophotometer provides an output signal representing the degree of absorption and an output signal representing the wavelength at which such degree of absorption occurs. A switching circuit responsive to the wavelength signal controls the application of the absorption signal to the pen inputs of individual recorder channels, and also expediently controls the chart drive of each channel.

Assuming that the qualitative composition of the sample is already known, the wavelength spectral regions associated with each sample component are likewise known so that the overall scan range can be divided into spectral regions belonging to each component. Such component spectral region information is utilized in the invention to set the switching circuit to divert the absorption signal from one recorder channel to another so that during the wavelength scanning process, the absorption signal is applied to the recorder channel that corresponds to a preassigned sample component whenever the instantaneous scan wavelength lies within a spectral region belonging to that component, as determined from the wavelength signal.

To avoid waste of recorder chart space, a multichannel recorder having an independently operable chart drive for each channel is preferably used. The switching circuit is then arranged to control the chart drive of each channel so that only the particular channel to which the absorption signal is applied will be running. A timer is provided to allow limited chart running between recordings of separate spectral region absorption data for each sample component, so that the successive spectral region recordings of each component will be spaced physically apart on the chart. The switching circuit also has a feed back input to the wavelength scan motor of the spectrophotometer to interrupt the wavelength scan during such intervals when the timer allows free chart running. In this way, after one spectral region has been scanned, no absorption data from the next spectral region will be lost by reason of free chart running, as might occur if wavelength scanning were allowed to continue during such intervals.

To allow analysis of samples taken from different sources and presented one at a time to the spectrophotometer, the invention provides a solenoid valve means operated by the switching circuit in accordance with the wavelength signal. When the wavelength spectrum of interest for the first source sample has been scanned and the absorption data for all of its components are recorded on individual channels of a first recorder group, as indicated by a wavelength signal corresponding to either an upper or lower limit of such spectrum, the switching circuit operates the solenoid valve means to discharge the first sample from the spectrophotometer cell and introduce therein a new sample taken from the second source. After the second sample is thus presented to the spectrophotometer, its absorption analysis proceeds in the same manner as for the first sample, except that the recorder changeover wavelengths of the switching circuit are reset for the values corresponding to the component spectral regions of the second sample.

Upon completion of the second sample analysis, again as determined from the wavelength signal, the switching circuit operates to discharge the second sample from the spectrophotometer cell and introduce a new sample taken either from a third source, or from the first source for analysis as before.

With appropriate programming of the switching circuit, the apparatus of the invention can be used to perform a quasi-continuous absorption analysis of a flowing fluid stream or of a plurality of such streams simply by analyzing a series of individual samples taken in cyclical sequence. The degree to which such quasi-continuous analysis approaches a theoretical continuous analysis will of course depend upon the repetition frequency and the rate at which the sample compositions change.

The absorption data signal and the wavelength signal, both derived from the spectrophotometer, can in general be in any physical form, such as electrical, mechanical, pressure, etc., with such conversion as appropriate to suit the needs of the switching circuit and recorder channels. However, the wavelength signal is preferably derived from the spectrophotometer in the form of an analog shaft rotation. Such preference is due to the fact that conventional spectrophotometers commonly are provided with a drum chart that rotates in accordance with the scan wavelength in a linear relation. With such a drum already available on the spectrophotometer, the setting of the recorder changeover wavelength points in the swtiching circuit is accomplished by means of cam rings mounted on or to the drum itself, and stationary microswitches positioned for actuation by the cam rings.

For each type of sample, a cam ring is provided with a switch actuating contour laid out in accordance with the angular positions of the drum that represent the changeover wavelengths of spectral regions for the various components of that sample.

The absorption data signal can be expediently derived from the spectrophotometer in either electrical or mechanical form. Since most commercially available recorders are built to take electrical pen inputs, the conversion of whatever absorption data signal is available from the spectrophotometer into an appropriately scaled pen input signal voltage can be easily accomplished by well known engineering techniques.

For spectrophotometers having mechanically driven drum recording pens, a potentiometer coupled for arm rotation in accordance with the pen motion is preferably employed since the potentiometer excitation voltage can be selected to give an arm voltage range acceptable to the individual component absorption data recorders used, which arm voltage then becomes the absorption data analog signal to the recorders.

Brief description of the drawing

The advantages and objects of the invention will become furthermore apparent from the following detailed description of the embodiments thereof and the drawing in which.

Description of the preferred embodiments

Figure 3:
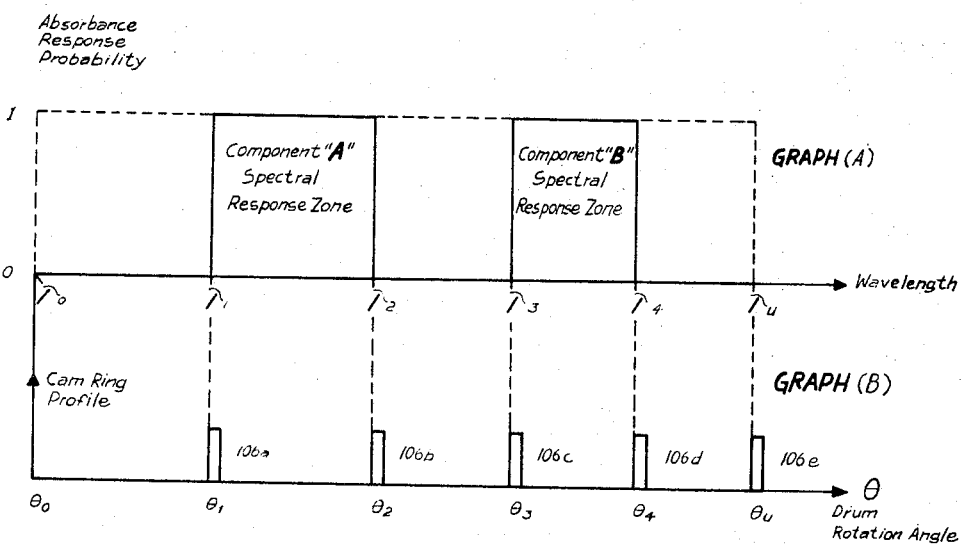
FIG. 3 is a schematic diagram illustrating the developed configuration of a typical cam ring used in the apparatus of FIG. 1 to control the diversion of the absorption data signal by the switching circuitry to the proper recording channel.

A multi-component fluid mixture, such as a gas mixture having two components A and B, when analyzed by a spectrophotometer will in general exhibit a radiation absorbance, or transmittance, which varies with wavelength. Graph (A) of FIG. 3 shows the absorption spectral regions of a hypothetical mixture of components A and B over a wavelength spectral range lying between a lower wavelength limit $\lambda_0$ and an upper wavelength limit $\lambda_u$. Within this range exist wavelength spectral regions or zones of interest wherein the degree of radiation absorbance can be identifiably associated with a distinct component A or B.

One such region, bounded by the wavelengths $\lambda_1$ and $\lambda_2$, is associated with component A, and another region, bounded by the wavelengths $\lambda_3$ and $\lambda_4$, is associated with component B. The two wavelengths regions bounded by $\lambda_2$ and $\lambda_3$, and by $\lambda_4$ and $\lambda_u$ represent portions of the spectra of no interest for analysis purposes.

It should be noted that Graph (A) of FIG. 3 merely serves to identify the locations of the component A and B absorption response portions of the spectrum, and does not represent magnitudes of any particular absorbance values that are actually measurable within such spectral zones, and for such purpose a probability scale is chosen for the ordinate of Graph (A). In the direction of increasing wavelength, beginning at $\lambda_0$, the probability of obtaining an absorbance response of interest is zero from $\lambda_0$ up to $\lambda_1$, and from $\lambda_1$ to $\lambda_2$ such probability is unity by hypothesis, since the $\lambda_1$ and $\lambda_2$ zone is one of interest pertaining to component A. Similarly, from $\lambda_2$ to $\lambda_3$, as well as from $\lambda_4$ to $\lambda_u$, there exists no absorption response zone of interest, but the intermediate zone from $\lambda_3$ to $\lambda_4$ is a zone of interest pertaining to component B.

For any specific component A or B, the wavelength limits of its characteristic absorption spectral zones are known, and the degree of absorbance measured will depend upon the concentration or quantitative proportion of that component in the mixture, a fact which enables the apparatus of the invention to be used for determining the quantitative proportions of the mixture components A and B.

In recording the absorbance response values obtained by a spectrophotometer which scans an overall spectral region from $\lambda_0$ to $\lambda_u$ and generates an analog signal output representing the instantaneous absorbance value of the mixture, it is desirable to record all absorbance values taken at wavelengths associated with each component on a separate recorder chart, so that all absorption data belonging to component A will be grouped together on one assigned chart, and all absorption data belonging to component B will likewise be grouped together on another assigned chart, and so on, for mixtures having more than two components.

Figure 1:
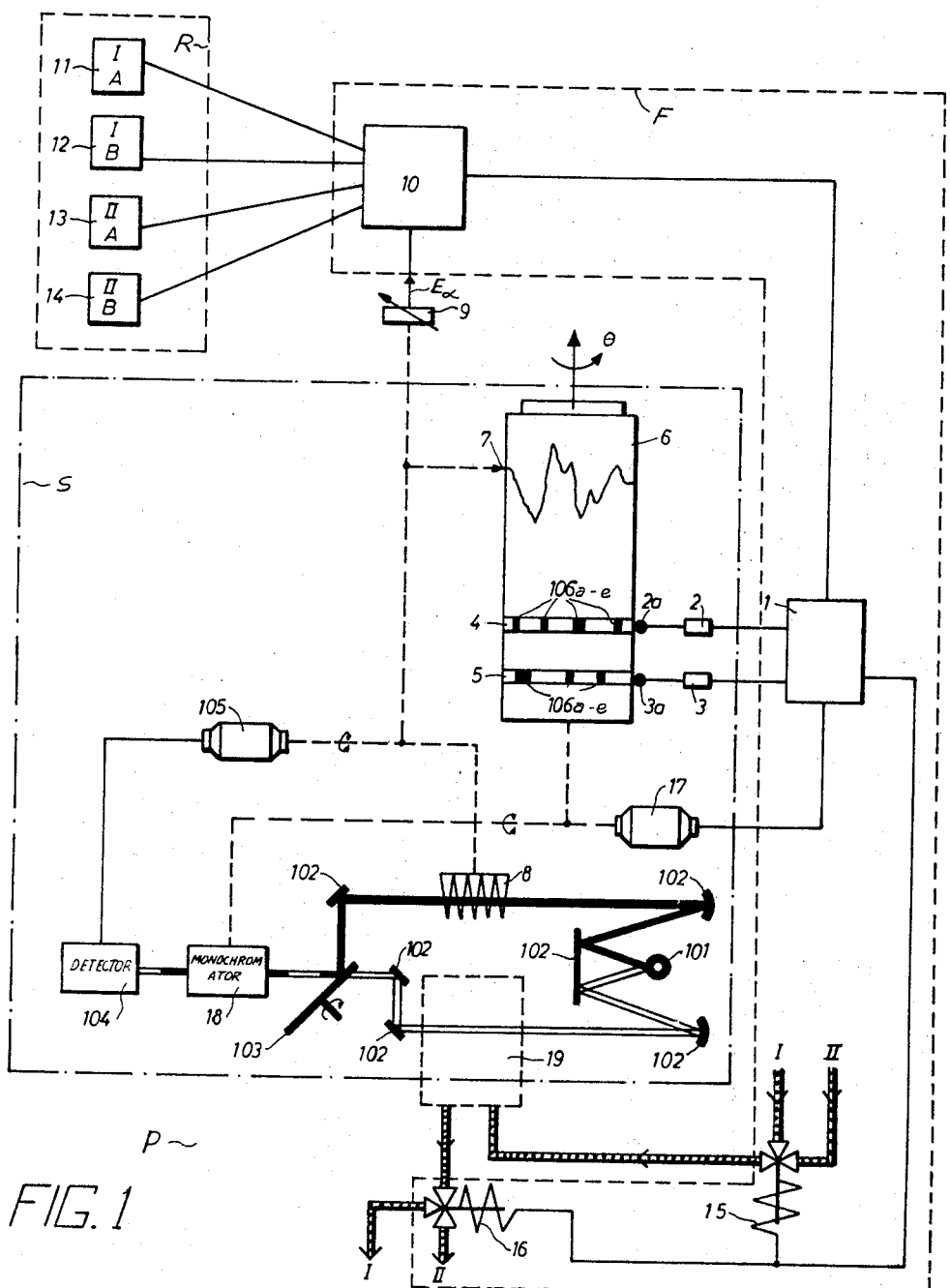
FIG. 1 is a schematic diagram of a spectral photometer analysis apparatus according to a preferred embodiment of the invention.

The invention provides such a spectral photometer analysis apparatus P which as illustrated by FIG. 1 comprises essentially a spectrophotometer S, a multi-channel recorder means R, and a switching circuit means F.

The spectrophotometer S is a conventional spectrophotometer such as type No. 137 manufactured by Perkin-Elmer, or any other type which has a cell 19 disposed to receive a multi-component fluid sample for analysis, such as a sample taken from either of the two fluid sources I and II, and has radiation absorption measuring means for measuring the absorbance of the sample and generating an output signal representing the value of said absorbance, and also has a wavelength scanning means to vary the instantaneous wavelength at which the absorbance is measured, which scanning means generates an output signal representing instantaneous absorbance measurement wavelength.

The wavelength signal is utilized in the invention to control the recording of the absorbance signal by recorder channels 11, 12, 13, 14 one at a time. For purposes of example, it has been assumed that both fluid sources I and II are mixtures of components A and B. Recorder channels 11 and 12 are assigned to record the absorption data for components A and B respectively for samples taken from source I, and recorder channels 13 and 14 are similarly assigned to record the absorption data for components A and B respectively for samples taken from source II.

Switching circuit means F, which is subdivided into an instrument control circuitry portion 1 and a measuring bridge circuitry portion 10, controls the application of the absorbance signal to recorder channels 11, 12, 13, 14 in accordance with the wavelength signal so that whenever the wavelength being scanned by spectrophotometer S falls within the A component spectral region, the absorbance signal is applied to recorder channel 11 where the sample under analysis is from source I, and to recorder channel 13 where the sample is from source II. For wavelength signals representing scan wavelength within the B component spectral region, the absorbance signal is applied to recorder channel 12 for source I samples, and alternatively to recorder channel 14 for source II samples.

With a typical commercially available spectrophotometer S, having a recorder drum 6 rotatably driven in accordance with the instantaneous wavelength at which the absorbance measurement is made, the wavelength signal can be expediently taken from the drum 6 rotation angle in the form of an analog shaft rotation $\theta$. For example, where drum 6 is at a reference angular position $\theta_0$ for a scan wavelength $\lambda_0$, and spectrophotometer S has an overall wavelength scanning range at least including the wavelength spectrum from $\lambda_1$ to $\lambda_4$, such that wavelengths $\lambda_1$, $\lambda_2$, $\lambda_3$, $\lambda_4$ and $\lambda_u$ correspond respectively to drum 6 angular positions $\theta_1$, $\theta_2$, $\theta_3$, $\theta_4$ and $\theta_u$, as indicated by Graph (B) of FIG. 3 the A recorder 11 or 13 will be turned on for absorbance signal recording at drum 6 angles between $\theta_1$ and $\theta_2$, and the B recorder 12 or 14 will be turned on for absorbance signal recording at drum 6 angles between $\theta_3$ and $\theta_4$. It should be noted that since the wavelength spectrum from $\lambda_0$ to $\lambda_u$ has been subdivided into absorbance response regions each associated with a single component A or B, whenever an A recorder is on, the B recorder for the particular sample source I or II, will be off, and vice versa.

The selection of the proper recorder channel 11–14 as identified by wavelength is effected by means of microswitches 2 and 3 having operating rollers 2a, 3a respectively positioned for actuation by cam rings 4 and 5 mounted to drum 6 for rotation therewith. Microswitch 2, its roller 2a, and cam ring 4 are provided for recorder channel switching with source I samples, and microswitch 3, roller 3a and cam ring 5 are provided for recorder channel switching with source II samples.

A typical developed layout which can be used for profiling the cam rings 4 and 5 is shown by Graph (B) of FIG. 3. At angular positions $\theta_1$, $\theta_2$, $\theta_3$ and $\theta_4$ which represent the transition wavelength points between consecutive spectral zones, the cam rings 4 and 5 have projections 106a, 106b, 106c and 106d respectively, each arranged for actuating a microswitch 2 in the case of cam ring 4, and for actuating a similar microswitch 3 in the case of cam ring 5. Where both sample sources I and II contain the same components A and B, the arrangement of projections on cam rings 4 and 5 will be identical, but for different components such arrangement will be changed accordingly.

The microswitches 2 and 3, their rollers 2a, 3a, and corresponding cam rings 4 and 5 function similarly. For example, in the analysis of a sample from source I, at the start of wavelength scan, the index of drum 6 is positioned at $\theta_0$, and rotates toward position $\theta_1$ whereat the cam ring 4 projection 106a momentarily actuates microswitch 2 as its roller 2a is lifted by said projection 106a. This transient actuation of microswitch 2 is utilized to effect switching of the absorbance value signal to recorder 11, since as drum 6 rotates between $\theta_1$ and $\theta_2$, the scan wavelength will be within the component A response zone. When drum 6 arrives at $\theta_2$, microswitch 2 will again be momentarily actuated, but this time by projection 106b on the same cam ring 4. This second actuation of microswitch 2 is used to remove the absorbance value signal from recorder 11, because as drum 6 rotates from $\theta_2$ to $\theta_3$, the scan wavelength will be outside of the component A response zone, and in fact within a wavelength zone of no particular interest for recording purposes. Upon arrival of drum 6 at $\theta_3$, a third momentary actuation of microswitch 2 will occur by reason of projection 106c, this third actuation of microswitch 2 being used to effect switching of the absorbance value signal to recorder 12, since $\theta_3$ marks the beginning of the component B response zone which extends from $\theta_3$ to $\theta_4$. At $\theta_4$, the end of the B response zone, projection 106d will cause a fourth actuation of microswitch 2, thereby effecting the removal of the absorbance value signal from recorder 12, since the drum rotation from $\theta_4$ to $\theta_u$ corresponds to scan wavelengths outside any zone of interest. At $\theta_u$, a projection 106e is provided on the cam ring 4 for the purpose of causing a fifth actuation of microswitch 2 that is utilized for reversing the drum 6 rotation and returning the drum 6 to the starting position $\theta_0$ for repetition of the analysis cycle using a new sample taken from source II.

The analysis of the source II sample proceeds in the same manner as with the source I sample, except that the projections 106a–e on cam ring 5 through their actuation of microswitch 3 control the switching of the absorbance value signal to recorders 13 and 14 which are respectively assigned for recording component A and component B absorption data from source II samples.

The projections 106a–e for the cam rings 4 and 5 can be expediently similar in height, but as can be appreciated by the artisan, their angular arrangement shown herein is based upon a hypothetical sample with assumed component absorption response characteristics, and therefore, for any actual sample mixture, the cam ring 4, 5 layout will have to be changed to match the absorption response pattern or signature of whatever components are involved.

The present invention affords numerous advantages in a variety of different data recording applications, and is not in any way limited in its concept to use in a spectrophotometer recording servomechanism system such as presented in the drawing and which will be explained for illustrative purposes.

The spectrophotometer S shown in FIG. 1 is a spectrophotometer system of the double beam type which operates on the null principle, i.e. the system is continuously maintained in a state of balance and the usable absorbance value output signal is derived from the instantaneous adjustment necessary to maintain the balanced condition. In the case of an infrared spectrophotometer S, the measurement value output signal can be indicative of the transmittance or absorbance of a particular sample throughout a scanned wavelength spectrum, and hence a measure of the quantitative proportions of the various sample components.

In such a spectrophotometer S, a source of infrared radiation 101 is positioned with respect to suitable optical elements 102 to form two beams of radiation, a sample beam shown in outline and a reference beam shown in solid black. The sample to be analyzed is introduced into a cell 19 through which the sample beam is passed.

An optical attenuator 8 is adapted to be adjustably positioned in the reference beam. In a typical spectrophotometer S, the sample absorbs some of the radiation in the sample beam and transmits the remainder, and the optical attenuator 8 is positioned in the reference beam to attenuate a like amount of radiant energy so that the sample beam after passing through the sample in cell 19, and the reference beam after passing through optical attenuator 8 are maintained in a state of balance as to energy level. Thus, the position of attenuator 8 is indicative of the transmittance or absorbance characteristics of whatever sample is present in cell 19.

Double beam spectrophotometer systems are usually designed so that the beams are combined at a common point such as at an optical chopper 103. As is well known in the art, the chopper 103 may expediently comprise a semicircular reflective disc which is rotated by a motor (not shown) to alternately pass equal interval portions of the sample beam and the reference beam along a common path to the entrance slit of a monochromator 18. Within the monochromator 18, the entrant combined beams are scanned through a wavelength spectrum that encompasses the continuous wavelength range from $\lambda_0$ to $\lambda_u$.

Wavelength scanning within monochromator 18 is accomplished by a motor 17 which is coupled to drive a rotatable wavelength scan element (not shown) in said monochromator 18. Thus, the angular position of the motor 17 shaft (indicated schematically by a dashed line) will establish the wavelength bandwidth of the combined beams that emerge from monochromator 18 and fall upon the radiation-sensitive detector 104 which responds to the instantaneous intensity of the radiant energy impinging thereon, converting it into an electrical signal by means such as a thermocouple (not shown). The shaft of motor 17 is also coupled to drum 6 to rotate same in accordance with the scan wavelength, so that the angular position of said drum 6 directly corresponds to the wavelength of radiation sensed by detector 104.

Detector 104, shown in block element form, includes an amplifier (not shown) which raises the absorbance value signal derived at low level from a transducer such as a thermocouple (not shown) to a level sufficient to operate a servomotor 105 which is coupled to attenuator 8 to adjust same for constant intensity of combined beams at detector 104. Thus, the displacement of servomotor 105, which displacement is expediently a rotary shaft displacement, required to effect such intensity balance of the combined beams, is actually an analog output signal representing the absorbance value of the sample in cell 19.

This absorbance value signal is applied to a recording pen 7 which registers on a chart carried by drum 6, and is also applied to adjust the variable tap of a potentiometer 9. The position of such variable tap represents the absorbance value signal in the form of an analog shaft rotation, which for recording channels 11–14 designed to accept only electrical signal inputs, requires a mechanical-to-electrical signal conversion. Such conversion can be simply accomplished by exciting potentiometer 9 with an electric voltage source of a level compatible with the scaling requirements of channels 11–14. In FIG. 1, the electrical analog signal representing the absorbance value is designated by $E_a$, and the wavelength value output signal is designated by the drum 6 rotation angle $\theta$.

Figure 2:
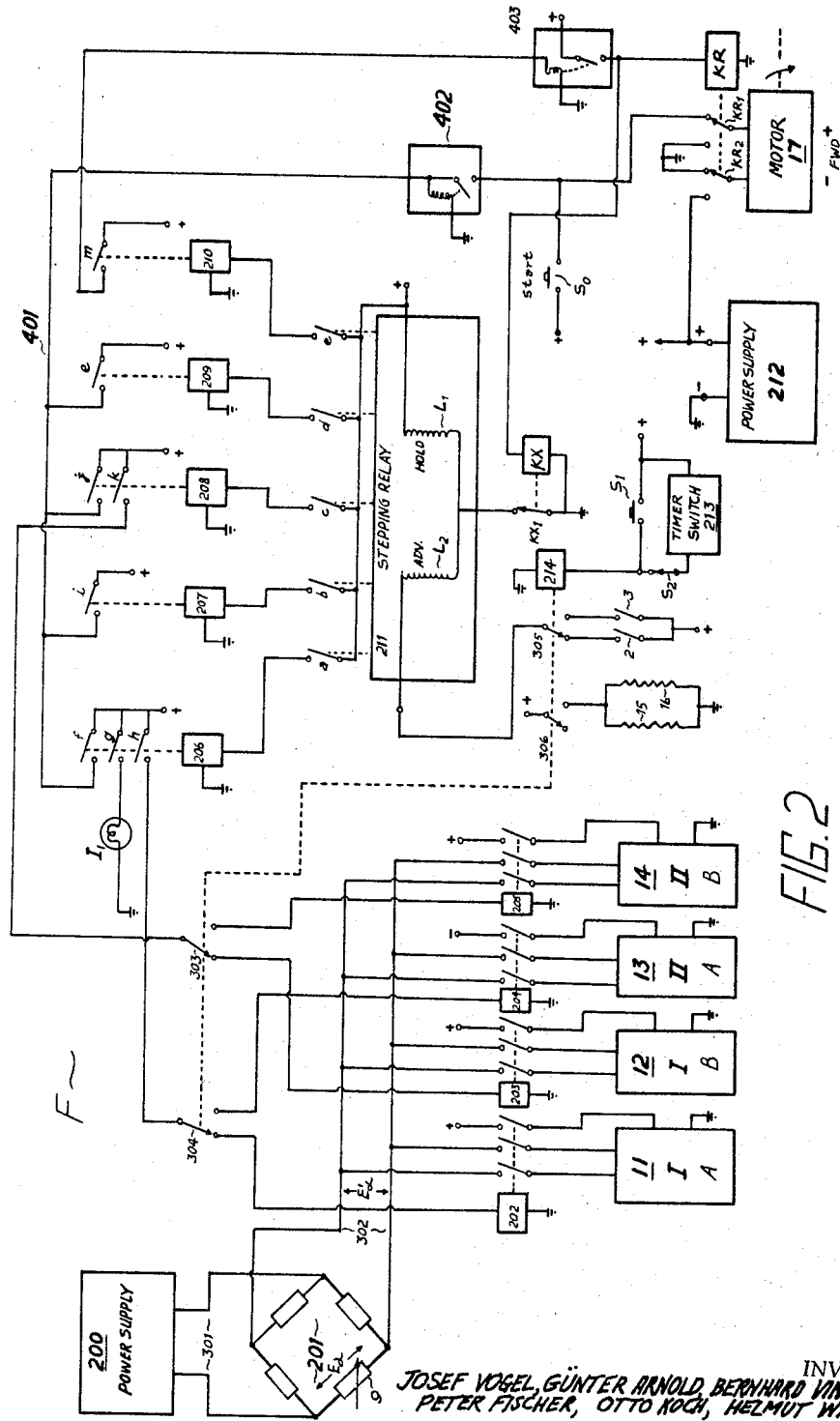
FIG. 2 is a schematic diagram illustrating in detail the switching circuitry used in the apparatus of FIG. 1 to control the application of the absorption data signal to the various recorders therein in accordance with the wavelength scan of the spectrophotometer.

The switching circuit means F as illustrated in block element form by FIG. 1 has been arbitrarily subdivided into the control instrument circuitry 1 and the measuring bridge circuitry 10, but as exemplified by FIG. 2, the switching circuit means F can be represented in an integrated form as a circuit means which receives the absorbance signal $E_a$, and the wavelength signal $\theta$ after conversion into an equivalent switching state by the action of microswitches 2, 3 governed by the cam rings 4, 5, and on the basis of the information content of the wavelength signal $\theta$, diverts the absorbance signal $E_a$ from the input of one recorder channel 11–14 to another.

In addition the switching circuit means F supplies a feedback signal to the motor 17 to regulate the wavelength scanning operation so that during such times as the absorbance signal $E_a$ is being switched from one channel to another, wavelength scanning is interrupted. This advantageously avoids the possibility of missing any absorption data from those portions of the wavelength spectrum that would otherwise be scanned during channel switching.

As exemplified by FIG. 2, the potentiometer 9 has its adjustable tap connected so that potentiometer 9 is a variable resistance in a Wheatstone resistance bridge 201 excited by an electrical voltage source 200 connected thereto via lines 301. The absorbance signal $E_a'$ that is actually applied to recorder channels 11–14 is derived from bridge 201 via lines 302. The inputs of recorder channels 11, 12, 13 and 14 are individually connectible to the $E_a'$ signal distribution lines 302 by double-pole switching contacts of relays 202, 203, 204 and 205 respectively, these contacts being normally open.

A relay 214 having four single pole-double throw switching contacts 303, 304, 305 and 306 is provided to control the selection of either pair of recorder channels 11 and 12, or 13 and 14 in accordance with the source I or II from which the sample under analysis was taken. As can be noted from FIGS. 1 and 2 together, the selection of either sample source I or II is controlled by the operation of solenoid valves 15 and 16. To introduce a sample from source I into cell 19, both solenoid valves 15 and 16 are placed in a de-energized state as indicated by the position of contact 306 in FIG. 2, and conversely to introduce a sample from source II into cell 19, said valves 15 and 16 are energized.

Electrical power, preferably D.C., for operating the various relays in FIG. 2 is expediently taken from a D.C. power supply 212, and solenoid valves 15 and 16 are for convenience of a type which is operable from the same supply 212.

Regardless of whether the sample is taken from source I or II, relay 206 operates whenever the active microswitch 2 or 3 responds to a component A zone on its associated cam ring 4, 5, and similarly, relay 208 operates whenever a component B zone on the cam ring 4, 5 is sensed.

As previously mentioned, when the drum 6 rotates from $\theta_0$ to $\theta_u$, the microswitch 2 or 3 corresponding to the sample source undergoes a series of momentary actuations as its roller 2a, 3a engages the cam ring 4, 5 projections 106a–e.

A stepping relay 211 performs several important logic switching functions in accordance with such microswitch actuation. Relay 211 is expediently a double coil stepping type having a holding coil $L_1$ which is continuously energized (except during resetting) and an advancing coil $L_2$, and a plurality of contacts $a$, $b$, $c$, $d$, $e$, normally open. The advancing coil $L_2$ is momentarily energized by the microswitch 2 or 3 selected by switching contact set 305 each time said microswitch 2 or 3 is momentarily actuated. For the source I sample state shown in FIG. 2, as the microswitch 2 undergoes a series of actuations during the forward rotation of drum 6 from position $\theta_0$ to $\theta_u$, the contacts $a, b, c, d, e$ will close in sequence, beginning with contact $a$, and with each closure, the preceding closed contact will open.

Thus, all contacts $a, b, c, d, e$ will be initially open and remain open until drum 6 arrives at $\theta_1$, upon which event contact $a$ will close and operate relay 206, closing its three contact sets $f, g$ and $h$. Contact $h$ applies voltage through contact set 304 to energize relay 202 which then operates to turn on the chart drive of recorder 11 and connect the recorder 11 input to lines 302 for recording the absorption value signal during wavelength scanning of the component A zone ($\lambda_1$ to $\lambda_2$). Contact $f$ applies voltage to line 401 which in turn energizes a time delay switch 402 to apply the voltage to wavelength scan drive motor 17 through contact set KR1 of relay KR to drive said motor 17 in the forward direction (increasing wavelength) from $\theta_1$ to $\theta_2$ to scan the component A zone. The provision of the time delay switch 402 allows each recorder 11-14 to run free for a short time while wavelength scanning is interrupted, so as to allow sufficient space on the recorder 11-14 charts to distinguish between successive absorption data runs.

A normally open switch So is provided for applying voltage to motor 17 for initial starting purposes when the drum 6 is at $\theta_0$. Switch So is held closed until the drum 6 arrives at the first cam ring 4 projection 106a, i.e. $\theta_1$, which can readily be detected by the illumination of an indicator lamp $I_1$, energized by the closure of contact $g$ of relay 206, and upon which occurrence switch So is released to its normally open state.

Relay 206 will remain energized until the wavelength scanning of the component A zone is completed, upon which event, drum 6 will arrive at $\theta_2$ and microswitch 2 will be again momentarily actuated by cam ring 4 projection 106b. This will cause relay 211 to open contact $a$ and close contact $b$, thereby energizing relay 207 and de-energizing relay 206. With relay 206 de-energized, recorder 11 is turned off and the absorption signal removed from its input. During the scanning of the $\lambda_2$ to $\lambda_3$ zone, as drum 6 rotates from $\theta_2$ to $\theta_3$, whatever absorption data signal appears on lines 302 is simply not recorded because such particular zone is of no interest. Contact set $i$ of relay 207 keeps the motor 17 driving drum 6 in the forward direction so as to traverse the $\lambda_2$ to $\lambda_3$ zone.

Upon arrival of drum 6 at $\theta_3$, the beginning of the component B zone, microswitch 2 will be momentarily actuated by cam ring 4 projection 106c, thereby opening contact $b$ and closing contact $c$ of relay 211. This causes relay 207 to de-energize and relay 208 to be energized. De-energization of relay 207 will cause time delay switch 402 to reset, and wavelength scan will be interrupted until the preset chart spacing delay has expired after contact $j$ of relay 208 closes to continue the driving of drum 6 from $\theta_3$ to $\theta_4$. During wavelength scanning of the component B zone, contact $k$ of relay 208 is closed to apply voltage through contact set 303 to relay 203 to energize same, thereby turning on recorder 12 and applying to the input thereof the absorption data signal. At the end of component B zone scanning, drum 6 arrives at $\theta_4$, cam ring 4 projection 106d momentarily actuates microswitch 2 thereby opening contact $c$ and closing contact $d$ of relay 211 to de-energize relay 208 and energize relay 209. With relay 208 de-energized, recorder 12 will be turned off, and the absorption data signal removed from its input.

Relay 209 functions by closure of its contact set $e$ to continue the forward driving of drum 6 until it reaches $\theta_u$, the upper limit of its range, and during the driving of drum 6 from $\theta_4$ to $\theta_u$, corresponding to the non-interest wavelength zone $\lambda_4$ to $\lambda_u$, there is no absorption data signal recording by any of the recorders 11-14.

Upon arrival of drum 6 at $\theta_u$, cam ring 4 projection 106e momentarily actuates microswitch 2 thereby opening contact $d$ and closing contact $e$ of relay 211 to de-energize relay 209 and energize relay 210. De-energization of relay 209 restores the time delay switch 402 to a reset condition.

Relay 210 operates to close its contact $m$ and apply voltage to operate another time delay switch 403. Time delay switch 403 can be expediently a relay, as shown in FIG. 2, of the type which operates instantaneously upon application of operating voltage, but remains in a closed switch holding state for a predetermined drop-out delay time after removal of operating voltage. This drop-out delay time of the time delay switch 403 is equal to the time required for motor 17 to drive drum 6 in the reverse direction from $\theta_u$ to $\theta_0$.

Time delay switch 403, since its purpose is to regulate the reverse driving time of motor 17 to that precisely needed to return drum 6 to its forward starting position $\theta_0$, is a drop-out delay switching device, whereas time delay switch 402 is an operate delay switching device since its purpose is to delay forward driving of motor 17 long enough for recorder chart run spacing purposes. Accordingly, time delay switch 402 can be expediently a relay of the type which remains in an open switching state for a preset delay time after its operating voltage is applied, and then assumes a closed switching state, but reverts immediately to its normal open switching state upon removal of its operating voltage. Time delay relays which meet the requirements of time delay switches 402 and 403 are readily obtainable commercial components. As between the two time delay switches 402 and 403, the time delay switch 402 preferably has a much smaller time constant than time delay switch 403, since it can ordinarily be expected to take longer for drum 6 to return to its forward starting position than for the recorders 11-14 to run sufficient chart space to distinguish between consecutive absorption data runs.

Upon closure of relay 210 contact $m$, time delay switch 403 will apply voltage to operate relays KR and KX. Relay KR has a pair of single-pole double throw contact sets KR1 and KR2 which are normally in the position shown by FIG. 2 to allow proper polarization of motor 17, a D.C. motor, for forward drive operation.

When relay KR operates, its contacts KR1 and KR2 reverse the polarity of the voltage applied to the motor 17, thereby driving drum 6 in the reverse direction back to $\theta_0$. Because of the choice of the time constant for time delay switch 403, relay KR automatically reverts to its de-energized state restoring contacts KR1 and KR2 for normal forward motor 17 driving, when drum 6 returns to $\theta_0$. It should be noted that upon return of drum 6 to $\theta_0$, forward driving of drum 6 does not occur until switch So is closed.

Relay KX serves to reset the stepping relay 211 during the reversing of drum 6, and accomplishes such purpose by a normally closed contact set KX1 which remains open until drum 6 returns to $\theta_0$, thereby opening the ground return line of relay 211. With the ground line of relay 211 opened, the positive voltage pulses applied to its advance coil $L_2$, by reason of microswitch 2 closing as its roller $2a$ is lifted by cam ring 4 projections 106a-e passing in reverse sequence, will have no effect upon relay 211 contacts a-e, which will remain open until forward drum 6 motion recurs. This is advantageous because it prevents spurious operation of relays 206, 207, 208, 209 and 210, thereby precluding any operation of relays 202, 203, 204 and 205 which would cause unwanted recording operation during drum 6 reversal.

When drum 6 is returned to $\theta_0$, another analysis run can be performed, either upon the same source I sample, or upon a new sample taken from source II.

Introduction of a new sample taken from source II is accomplished by operating relay 214, which is a bistable, or flip-flop type relay. With relay 214 and its contacts 303, 304, 305 and 306 in the switching states shown by FIG. 2, for analysis of a source I sample, relay 214 can be operated to shift said contacts into their complementary switching states for analysis of a source II sample, either manually by momentarily closing a switch S1, or automatically by means of a timer switch 213 that operates to apply voltage pulses to relay 214 in accordance with a predetermined program for selection of samples from sources I and II. For manual operation switch S2 is opened to effect disconnection of timer switch 213.

Analysis of source II samples proceeds in the same manner as for source I samples, except that microswitch 3 is operated by cam ring 5, the solenoid valves 15 and 16 are energized, the relay 214 contacts are in their complementary switching states so that relay 206 controls the operation of relay 204 to record the component A absorption data on recorder 13 and relay 208 controls the operation of relay 205 to record the component B absorption data on recorder 14.

As can be appreciated from the foregoing description of the invention, the invention can be generalized as an analysis apparatus comprising the combination of an instrument means, a multi-channel recorder means, and a switching circuit means, in which combination the instrument means senses the value of a first physical parameter depending upon a second physical parameter over a plurality of bounded value ranges of the second parameter and generates output signals, one representing the value of each parameter, and wherein the switching circuit means applies the first parameter signal to the recorder signal inputs, one at a time, in accordance with the value of the second parameter as represented by its signal. By assigning each recorder channel to record the first parameter signal over a predetermined second parameter bounded value range, the second parameter signal is used to control the switching or diversion of the first parameter signal from one recorder channel to another.

In the preferred embodiment of the invention as illustrated by FIGS. 1 and 2, the switching circuit means includes switching logic circuitry, composed principally by relays 202–211, responsive to the actuation of the cam follower switch 2, 3 to determine from the number of actuations thereof, counted during the progress of wavelength scanning from one extreme limit wavelength $\lambda_0$, when the instantaneous scan wavelength is within each component spectral region, and to apply the absorbance signal carried on line 302 to the corresponding recorder channel 11–14 as the scan wavelength passes through each spectral region.

This switching logic circuitry is also responsive to a predetermined follower switch actuation count, established by the relay 210 connection to contact $e$ or relay 211, and corresponding to the terminal wavelength limit $\lambda_u$ to regulate the operation of the wavelength scanning means motor 17 to return the wavelength to a predetermined starting wavelength $\lambda_0$ upon attaining wavelength $\lambda_u$. This capability serves to accommodate repeated wavelength scanning over the continuous spectral range extending from $\lambda_0$ to $\lambda_u$.

To accommodate analysis of samples taken from different sources, the basic cam and follower switch arrangement can be repeated with approximate selector switching circuitry provided, as for example contacts 303–306 of relay 214, so as to enable the proper cam and follower switch combination to be selected for the particular sample source under analysis. In such case, the solenoid valve means 15 and 16 is operated by the selector relay 214 contact circuitry to introduce into the spectrophotometer 19 a sample taken from each fluid source I, II, one at a time, in a predetermined sequence upon each successive return of the scan wavelength to the starting wavelength $\lambda_0$, and through the action of the timer switch 213. Selector relay 214 circuitry can be made responsive to the return of the scan wavelength to starting wavelength $\lambda_0$ to connect to the switching logic circuitry the specific follower switch 2, 3 associated with the cam member 4, 5 representing the spectral region wavelength boundaries of the new sample introduced into the cell 19.

It should be noted that the specific connection of relay 211 contacts $a$–$e$ to operate the individual relays 206–210 can be varied to suit the spectral region wavelength boundaries of the actual sample used, the specific arrangement shown in FIG. 2 merely being chosen to effect recorder channel switching in accordance with the hypothetical spectral region wavelength boundaries shown in FIG. 3.

As can be appreciated by the artisan, other details and circuit arrangements which will become obvious from the foregoing description can be substituted and added to suit the needs of a particular application. However, the invention is intended to be limited only by the following claims in which we have endeavored to claim all inherent novelty.

What is claimed is:

1. A spectral photometer analysis apparatus which comprises a spectrophotometer means having a cell disposed to receive a multi-component fluid sample to be analyzed, radiation absorption measuring means for measuring the absorbance of said sample and generating an output signal representing the value of said absorbance, and wavelength scanning means for varying within a wavelength bounded radiation spectrum the wavelength at which such absorbance is measured and generating an output signal representing said absorbance measurement wavelength, a multi-channel recorder means, and switching circuit means coupled to the individual channel inputs of said multi-channel recorder means and to said spectrophotometer for response to said wavelength and absorbance output signals thereof to apply said absorbance signal to a recorder channel assigned to a specific component of the sample for recording thereby whenever said wavelength signal corresponds to a scan wavelength within a spectral region associated with said component, whereby absorbance values measured for all spectral regions associated with said component and lying within the wavelength bounds of the radiation spectrum scanned by said wavelength scanning means are recorded on a common recorder channel.

2. The spectral photometer analysis apparatus according to claim 1 wherein said multi-channel recorder means has a number of recording channels equal to the number of sample components, each channel being assigned for recording the absorbance values measured in the spectral regions associated with a corresponding sample component, and said switching circuit means is responsive to said wavelength signal to apply said absorbance signal to the recording channel corresponding to such component as is identified by a wavelength signal representing an instantaneous scan wavelength within a spectral region associated with said component, as said wavelength scanning means varies the scan wavelength over a continuous spectral range encompassing spectral regions associated with each sample component.

3. The spectral photometer analysis apparatus according to claim 2 wherein said spectrophotometer means includes a rotatable member driven in synchronism with said wavelength scanning means, the angular position of said rotatable member defining said absorbance measurement wavelength output signal of the spectrophotometer means, and said switching circuit means includes a cam member connected to said rotatable member for rotation therewith, and a follower switch disposed for actuation by said cam member at angular positions of said rotatable member corresponding to the wavelength boundaries of the spectral regions associated with each sample component to effect switching of said absorbance signal to the recorder channels, one at a time, assigned for recording absorbance values in said spectral regions.

4. The spectral photometer analysis apparatus according to claim 2 wherein said spectrophotometer means includes a moveable member driven in accordance with the measured absorbance value, and an electrically excited potentiometer connected to said member for movement therewith to generate an electrical analog signal representing the value of said measured absorbance.

5. The spectral photometer analysis apparatus according to claim 3 wherein said switching circuit means includes switching logic circuitry responsve to the actuation of said follower switch to determine from the number of actuations thereof, counted during the progress of wavelength scanning from one extreme limit wavelength, when the instantaneous scan wavelength is within each of said spectral regions, and to apply said absorbance signal to the corresponding recorder as the scan wavelength passes through each spectral region.

6. The spactral photometer analysis apparatus according to claim 5 wherein said switching circuit means is connected to said wavelength scanning means to interrupt the wavelength scanning operation thereof for holding the scan wavelength constant over a predetermined time delay interval upon entrance of the scan wavelength into each sample component spectral region to allow limited free running of the corresponding recorder channel at the beginning of the wavelength scan through each spectral region.

7. The spectral photometer analysis apparatus according to claim 5 including means for introducing into said spectrophotometer cell for analysis, a multi-component fluid sample taken from any selected one of a plurality of fluid sources.

8. The spectral photometer analysis apparatus according to claim 5 wherein said switching logic circuitry is responsive to a predetermined follower switch actuation count corresponding to a terminal wavelength limit to regulate the operation of said wavelength scanning means to return the scan wavelength to a predetermined starting wavelength upon attaining such terminal wavelength to accommodate repeated wavelength scanning over a continuous spectral range extending from said starting wavelength to said terminal wavelength.

9. The spectral photometer analysis apparatus according to claim 8 including a plurality of cam members connected to said rotatable member for rotation in unison therewith, and a plurality of follower switches each disposed for actuation by a corresponding cam member during the rotation thereof, each cam member being disposed to actuate its respective follower switch at rotatable member angular positions representing the wavelength boundaries of a set of spectral regions associated with the components of a sample characteristic of said cam member, and wherein said switching circuit means includes selector circuitry operable to connect said switching logic circuitry to a selected follower switch for response to the actuation thereof by the corresponding cam member to accommodate spectral absorption analysis of any one at a time of a plurality of samples having component spectral regions represented by said cam members.

10. The spectral photometer analysis apparatus according to claim 9 including solenoid valve means operable by said selector circuitry to introduce into said spectrophotometer cell for analysis, a multi-component fluid sample taken from each of a plurality of fluid sources one at a time in a predetermined sequence upon each successive return of the scan wavelength to said starting wavelength, said selector circuitry being responsive to the return of the scan wavelength to said starting wavelength to connect to said switching logic circuitry the follower switch associated with a cam member representing the spectral region wavelength boundaries of the new sample introduced into said cell.

References Cited

UNITED STATES PATENTS

| | | | |
|---|---|---|---|
| 2,888,623 | 5/1959 | Atwood | 88—14X |
| 3,196,449 | 7/1965 | Pelavin et al. | 346—49X |

RICHARD B. WILKINSON, *Primary Examiner.*

JOSEPH W. HARTARY, *Assistant Examiner.*